United States Patent [19]

Hintsch

[11] 4,230,210

[45] Oct. 28, 1980

[54] CLUTCH FOR A TEXTILE MACHINE

[75] Inventor: Otto Hintsch, Wallisellen, Switzerland

[73] Assignee: Sulzer Brothers Ltd., Winterthur, Switzerland

[21] Appl. No.: 926,194

[22] Filed: Jul. 19, 1978

[30] Foreign Application Priority Data

Jul. 21, 1977 [CH] Switzerland ............... 009049/77

[51] Int. Cl.² .................................................. F16D 11/06
[52] U.S. Cl. ........................................... 192/28; 192/33 R; 192/142 R; 139/66 R; 66/207
[58] Field of Search ............... 139/66 RX; 66/207 X; 192/28, 33 X, 142 X

[56] References Cited

U.S. PATENT DOCUMENTS

| | | |
|---|---|---|
| 3,468,347 | 9/1969 | Fumat ............... 139/66 R |
| 3,552,530 | 1/1971 | Cortona ............... 192/28 |
| 3,804,128 | 4/1974 | Amigues ............... 139/66 R |
| 4,139,997 | 2/1972 | Risen ............... 66/207 |

FOREIGN PATENT DOCUMENTS 123475 10/1958 U.S.S.R. ............... 139/66 R

*Primary Examiner*—Henry Jaudon
*Attorney, Agent, or Firm*—Kenyon & Kenyon

[57] ABSTRACT

The pawl is retracted from the intermittently rotatable input shaft via a controlled abutment and a spring biased lever-mounted or piston-mounted roller. The abutment serves to start retraction of the pawl while the spring biased roller presses against a non-circular surface of the cam plate on which the pawl is mounted to complete removal of the pawl from the recess. The cam plate also has one or more cam surfaces for resetting the abutment after the pawl has been engaged in the shaft.

14 Claims, 7 Drawing Figures

CLUTCH FOR A TEXTILE MACHINE

This invention relates to a clutch for a textile machine. More particularly, this invention relates to a clutch for moving a mechanical element of a textile machine.

Heretofore, various types of clutches have been known for use in textile machines in order to move various mechanical elements such as the shafts of a weaving machine or the guide bars of a warp knitting machine. In some cases, the clutches have an intermittently rotatable shaft formed with at least one groove, an eccentric which is rotatably mounted on the input shaft and a pawl which is disposed on the eccentric for selective engagement with the shaft groove. In one particular clutch, as described in German Pat. No. 1,154,048 Apr. 23, 1964, a lever which is pivoted out by a pull cable of a pattern selector is used to operate the pawl against the force of a spring. As a rule, a power drive, such as a griffe, must be provided between the pattern selector and the pivoted lever to provide the force necessary to overcome the pawl spring and disengage the pawl. As a result, these clutches have been relatively elaborate particularly because of the power drive.

Accordingly, it is an object of the invention to eliminate a power drive from a clutch for the moving elements of a textile machine.

It is another object of the invention to provide a clutch of relatively simple construction for use in a textile machine.

Briefly, the invention provides a clutch for moving a mechanical element of a textile machine which includes an intermittently rotatable input shaft having at least one recess, a cam plate rotatably mounted on the shaft, a pawl pivotally mounted on the cam plate, and at least one controlled abutment movable from one position in the orbit of the pawl to a second position spaced from the pawl orbit. The pawl is mounted on the cam plate for movement between an inoperative position spaced from the shaft recess and an operative position engaged in the shaft recess. When in the engaged position, the pawl and thus the cam plate are able to rotate with the shaft. When the controlled abutment is in the position in the orbit of the pawl, the pawl can be retracted from the shaft recess as the shaft rotates.

In accordance with the invention, the cam plate has at least one non-circular surface on the periphery and the clutch is provided with an input means for movement into engagement with this non-circular surface in order to effect a small rotation of the cam plate and complete withdrawal of the pawl from the shaft recess. A spring is also provided for biasing the input means into engagement with the cam plate.

The position of the input means relative to the non-circular surface of the cam plate and to the controlled abutment and pawl is such that the abutment initiates retraction of the pawl from the shaft recess before the input means becomes effective.

The force required to disengage the pawl can therefore be derived from the rotation of the cam plate or of the input shaft itself. The presence of the additional input means, which rotates the cam plate a few extra degrees while the pawl completes the final part of a disengaging movement from the shaft recess, renders the need for a power drive to disengage the pawl unnecessary and enables the power required to disengage the pawl to be derived solely from the abutment and from the rotation of the input shaft and cam plate. In particular, this makes it possible to ensure that the pawl is not snatched out of the recess during the final phase of disengagement and pulled over the shaft recess edge, as this would lead to heavy wear of the edge and the pawl. It would also be impossible to have complete disengagement from the cam plate to the extent that the input shaft and the pawl did not contact one another.

In one embodiment the input means is in the form of a cam-follower lever operatively associated with the recess.

Advantageously, the abutment is a pivoted lever which, during the engaged position and rotation of the input shaft and pawl, can be selectively moved by a programmer into the operative position corresponding to disengagement of the pawl and into the inoperative position.

In one construction, an abutment for the pawl is associated with each stoppage position of the input shaft and pawl. In this case, the pawl disengages in the operative position of the last-mentioned abutment and remains engaged in the inoperative position thereof.

A restoring means is also provided for restoring the abutment to the operative position after engagement of the pawl in the shaft recess. This allows the clutch to operate in such a way, for instance, that after each engagement phase the pawl disengages automatically as the input shaft continues to rotate. Consequently, the control signals from the programmer can be initiated in the same way at any standstill or stoppage position of the input shaft; the parts to be controlled always have the same initial position. However, an abutment-moving control signal can be given between the most recent engagement of the pawl and the next stoppage position of the drive shaft to produce an inoperative position of the abutment. In this way, the pawl is not disengaged at all if the pawl is required to remain engaged in the input shaft for the next step of operation—i.e., the next partial rotation of the input shaft.

These and other objects and advantages will become more apparent from the following detailed description taken in conjunction with the following drawings wherein:

FIG. 1a illustrates a view to an enlarged scale of a detail of FIG. 1;

Figure 1:
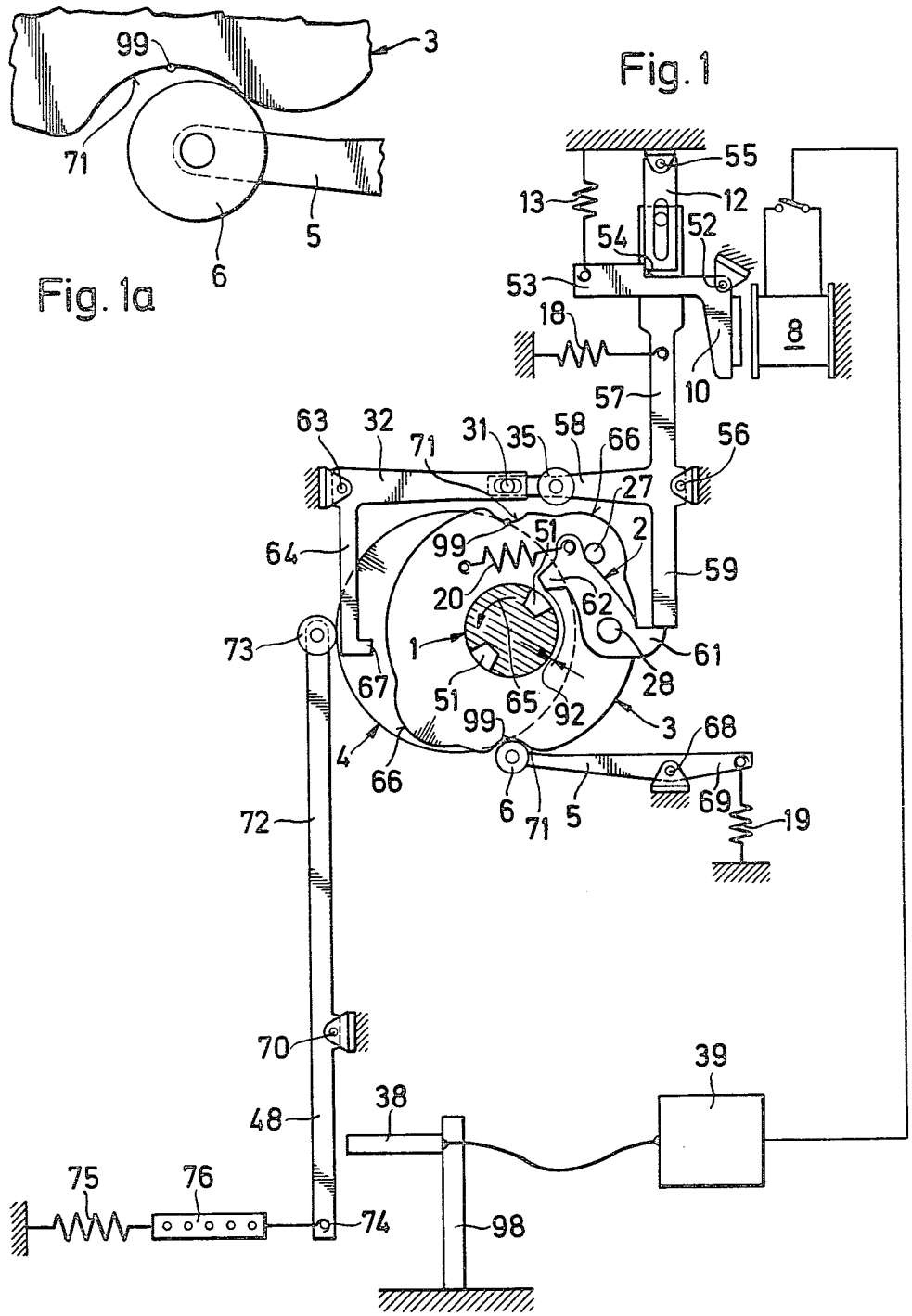
FIG. 1 illustrates a diagrammatic view of the main part of a clutch according to the invention for a warp knitting machine.
Figure 3:
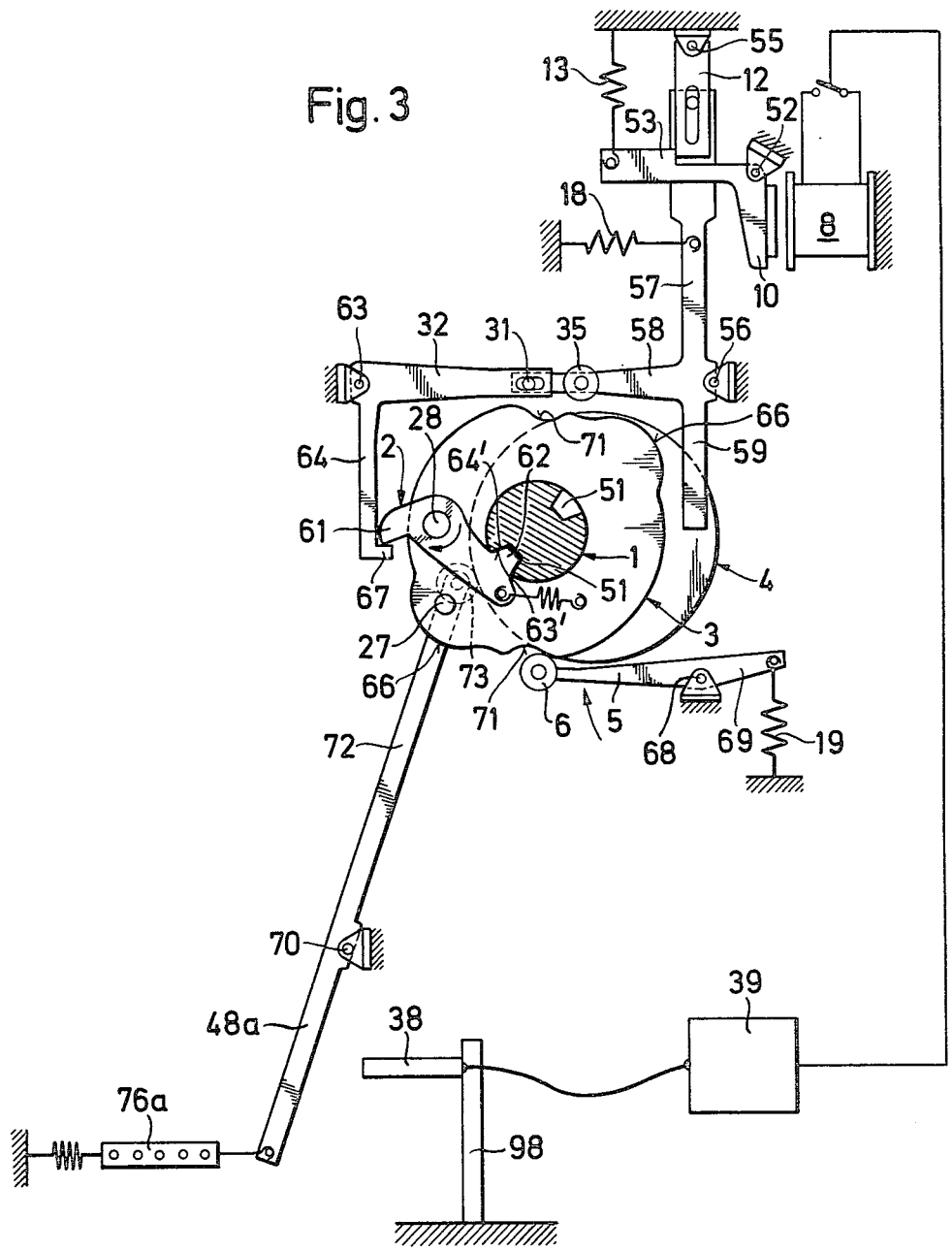
FIG. 3 illustrates a position of the clutch of FIG. 1 after a 180° turn of the shaft.

Referring to FIG. 1, the clutch is constructed with an input or drive shaft 1 formed with two recesses 51, each of which has two edges 63', 64' in the shaft surface (FIG. 3). The shaft 1 is intermittently rotatable in the direction indicated by the arrow 65 through 180° at a time, e.g. by a Maltese cross drive, during the operation e.g. of a warp knitting machine. A pair of cam plates or eccentrics 3, 4 are rotatably mounted on the shaft 1 and are interconnected to each other to rotate in unison. A pawl 2 is pivotally mounted on one cam plate 3 via a pivot 28 fixed to the cam plate 3 so as to move between an inoperative position spaced from the recess 51 and an operative position engaged in the recess 51. The pawl 2 is biased by a spring 20 which tends to pivot the pawl 2 counterclockwise as viewed in order to engage in the recess 51. As shown, the spring 20 is mounted at opposite ends on the cam plate 3 and pawl 2.

Figure 2:
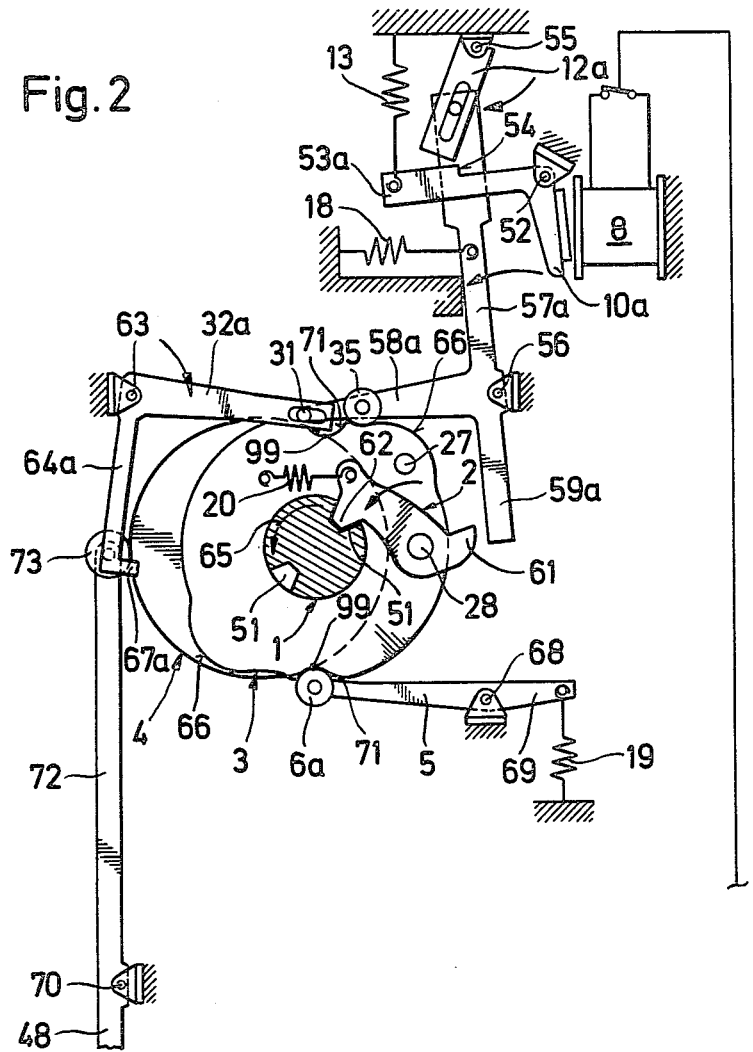
FIG. 2 illustrates a position of the clutch of FIG. 1 with the pawl engaged.

In order to engage the pawl 2 in the recess 51, a controlled abutment 59 in the form of a lever arm is positioned to move from a first position in the orbit of the pawl 2 to a second position spaced from this orbit (FIG. 2). The lever arm 59 is actuated by a programmer 39 e.g. an electronic control which transmits an electrical signal to an electro-magnet 8. The electro-magnet 8 is located in facing relation to one arm 10 of a two-armed lever 10, 53 which is pivotally mounted about a fixed pivot 52. The other arm 53 of the lever is connected to a spring 13 which is fixed to a stationary frame and serves to bias the lever 10, 53 away from the electro-magnet 8. The arm 53 has a shoulder 54 which abuts an intermediate lever 12 which depends in pivotal relation from the frame via a pivot 55. This lever 12 is slotted and receives a pin of an arm 57 of a three-armed lever 57, 58, 59. The three-armed lever 57, 58, 59 is, in turn, pivotally mounted on a pivot 56 fixed to a stationary frame. As shown, the lower arm 59 acts as an abutment for the pawl 2 while the third arm 58 carries a cam roller 35 which is located above the periphery of the cam plate 3. The upper arm 57 of the three-armed lever 57-59 is also connected via a spring 18 to a stationary frame so as to be biased away from the electro-magnet 8 as viewed.

The three-armed lever 57-59 is also linked to a two-armed lever 32, 64 via a hinged pin 31 and slot connection. The two-armed lever 32, 64 is pivotally mounted via a pivot 63 on a fixed frame and carries a projection 67 which serves as a second controlled abutment for pivoting the pawl 2 as explained below.

As shown, a limit stop 27 is formed on the cam plate 3 to limit the outward movement of the pawl 2 from the shaft 1. The pawl 2 also has a tail 61 which projects outwardly into the path of the abutment 59 as well as a projection 62 which is able to fit into the shaft recess 51. In the inoperative position shown in FIG. 1, the projection 62 is spaced by a gap 92 from the shaft 1.

The cam plate 3 also has a pair of non-circular surfaces 71, i.e. recesses, in the periphery. In addition, the clutch has an input means for movement into engagement with one of the surfaces 71 to effect rotation of the cam plate 3. As shown, this input means includes a lever 5 which is pivotally mounted on a pivot 68 secured to a fixed frame and a cam roller 6 which is rotatably mounted at one end of the lever 5. The opposite end of the lever 5 constitutes a short arm 69 which is connected via a spring 19 to a fixed frame so as to bias the lever 5 towards the cam plate 3.

The eccentric 4 cooperates with a double-armed lever 72, 48, which is pivoted about a pivot 70 mounted on a fixed frame, via a cam roller 53 which is rotatably mounted on the lever arm 72 to ride on the periphery of the eccentric 4. The other arm 48 of the lever is connected to a guide bar 76 of the warp knitting machine. The guide bar 76 is also connected to a spring 75 at the opposite end which is secured to a fixed frame to bias the guide bar 76 away from the lever arm 48.

A magnetic sensing element 38 is disposed on a stationary holder 98 adjacent the lever arm 48 to sense the position of the arm 48. The sensing element 38 is connected to the programmer 39 so that the programmer 39 is able to emit a signal to the electro-magnet 8 so that the pawl 2 can be engaged or not in dependence on whether or not the guide bar 76 is or is not to be moved as is known.

The cam plate 3 also has a pair of cam surfaces 66 on the periphery for engaging the roller 35 of the three-armed lever 57-59 during the rotation of the cam plate 3 for purposes as explained below.

In operation, if the pawl 2 is to engage the shaft 1, the programmer 39 transmits an electric signal to the electro-magnet 8. The two-armed lever 10, 53 is therefore pivoted counterclockwise as viewed, against the force of the spring 13, into the position 10a, 53a, shown in FIG. 2. The shoulder 54 of the arm 53 therefore descends so that the intermediate lever 12 and the three-armed lever 57-59 are pivoted; lever 12 moving into an inclined position 12a (FIG. 2) while lever 57-59 moves into the position 57a, 58a, 59a (FIG. 2). In this position, the roller 35 of the arm 58 rests on the periphery of the cam plate 3 and the tail 61 of the pawl 2 is clear. Consequently, the spring 20 pivots the pawl 2 into the engaged position which is shown in FIG. 2 and in which the projection 62 engages in the corresponding recess 51 of the shaft 1.

Simultaneously as the lever 57-59 pivots, the double-armed lever 32, 64, which is articulated to the arm 58 by way of the pivot 31, pivots clockwise as viewed in FIG. 1 into an inoperative position (FIG. 2).

The pawl 2 and cam plates 3, 4 now rotate with the shaft 1, as indicated by the arrow 65 during the next 180° rotation of the shaft 1. During this time, the roller 6 first reaches a stable position 6a which is shown in FIG. 2 and which corresponds to the lowest point 99 of the recess 71 (FIG. 1a). The electric signal ceases shortly after engagement so that the electro-magnet 8 becomes de-energized. One of the two protuberances 66 of the cam 3 through roller 35 then pivots the lever 57-59 back into the operative position shown in FIG. 1. The lever 12 is also returned to the operative position shown in FIG. 1 so that the spring 13 pivots the lever 10-53 as well back into the initial position of FIG. 1.

Towards the end of the 180° rotation, the tail 61 of the pawl 2 abuts the projection 67 of the lever 32, 64 to pivot the pawl 2 clockwise. Disengagement of the pawl 2 from shaft 1 begins. Also, the roller 6 is biased by the spring 19 to engage in the recess 71 in the cam plate 3. Because of the force applied by the spring 19, the cam plate 3 continues to rotate during the final portion of the 180° rotation of the shaft 1. Thus, even though the shaft 1 no longer drives the cam 3 since the projection 62 of the pawl 2 has disengaged completely from the recess 51 in the shaft 1, the cam 3 is caused to rotate a small amount due to the action of the spring biased lever 5. This action ceases when the pawl 2 abuts the stop 27 but is sufficient to cause the pawl 2 to move away from the surface of the shaft 1 so that a small clearance 92 occurs between the projection 62 and the periphery of the shaft 1. Consequently, the projection 62 disengages from the recess 51 without damaging the edges 63', 64' (FIG. 3).

Unlike what happens in the case of a catch, the elements 6, 71 are so devised that in the disengaged position shown in FIGS. 1 and 1a, the roller 6 has still not reached the lowest point 99 of the recess 71. Instead, the rotation of the pawl 2 and cam plate 3 ceases previously, as can be gathered more particularly from FIG. 1a.

Shaft 1 then rotates through a further 180°, the pawl 2 being in the disengaged state and the cam plates 3, 4 remaining stationary.

When the cam plate 4 moves from the position shown in FIG. 1, the double-armed lever 48, 72 is pivoted clockwise by the roller 73 so that the guide bar 76 of the warp knitting machine is moved to the left into the position shown in FIG. 3. Spring 75 tends to pull the bar 76 to the left and to pivot the lever 72, 48 clockwise so that the roller 73 remains in engagement with the cam 4.

In order to engage the pawl 2 with the shaft 1 when the pawl 2 is in the position shown in FIG. 3, the same sequence as described above takes place provided a signal is transmitted from the programmer 39 to initiate engagement. During such a sequence, the guide bar 76 is moved from left to right as viewed in FIG. 3.

Figure 4:
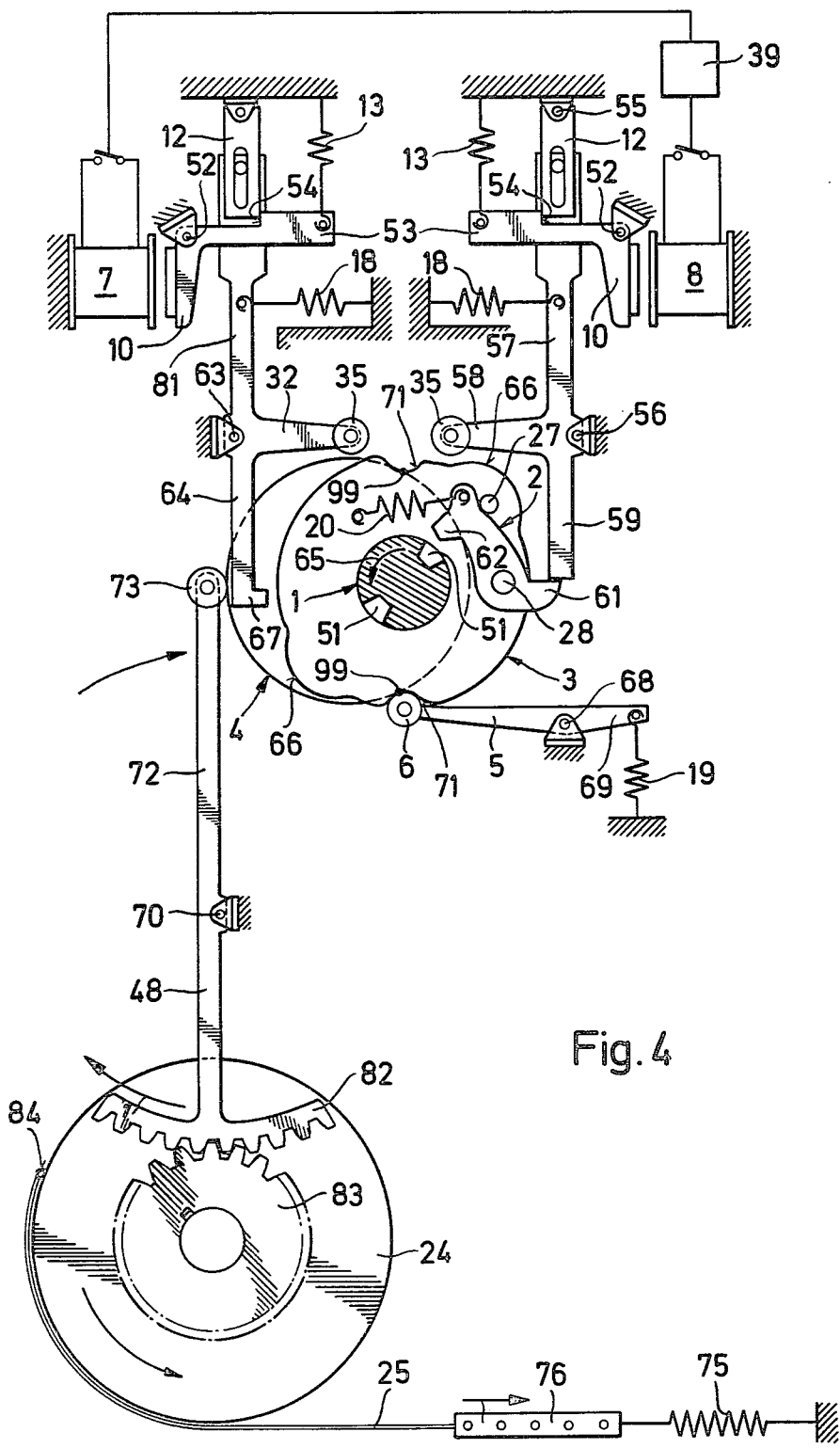
FIG. 4 illustrates another embodiment of a clutch according to the invention.

Referring to FIG. 4 wherein like reference characters indicate like parts as above, the lever 32 may have a third arm 81. In this case, the lever 81, 32, 64 co-operates, in the same way as the elements 57-59, 12, 10, 53, with a second electro-magnet 7 adapted to act by way of the arm 64 to engage the pawl 2. In this embodiment, the arm 48 has a toothed segment 82 which meshes with a gear 83. The gear 83 is, in turn, connected to a roller 24 to which a pull element, e.g. a pull cord 25 for a guide bar 76, is secured at a point 84. When the cam 4 pivots the lever 72, 48, the guide bar 76 reciprocates correspondingly.

Figure 5:
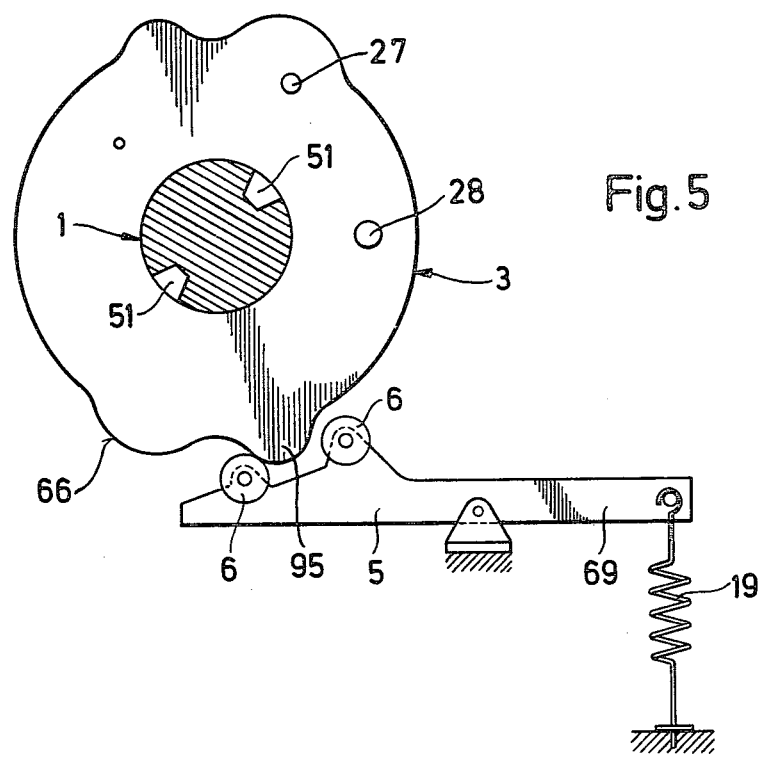
FIG. 5 illustrates a view of a modified cam plate and input means in accordance with the invention.

Referring to FIG. 5, the cam plate 3 may have a non-circular protuberance 95 instead of a recess. In this case, the associated cam-follower lever 5, 69 has two rollers or followers 6 which can provide an extra input means or drive for the cam plate 3.

In other constructions, the drive shaft 1 can be formed e.g. with just a single groove 51 or with four or six grooves 51, thus making it possible for the elements to have correspondingly different movement patterns. The number of recesses 71 and abutments 59, 67 is always the same.

Figure 6:
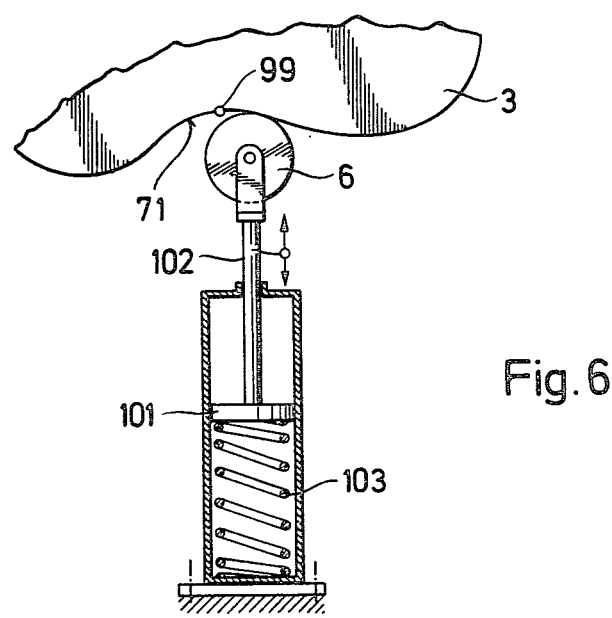
FIG. 6 illustrates a view of a modified input means in accordance with the invention.

Instead of using the lever 5, 69 as an input or drive means, it is possible to use, e.g. a thrust piston 101 (FIG. 6). In this case, the roller 6 is disposed at the exposed end of a piston rod 102 and is pressed by a spring 103 into the recess 71.

What is claimed is:

1. A clutch for moving a mechanical element of a textile machine, said clutch comprising
   an intermittently rotatable input shaft having at least one recess therein;
   a cam plate rotatably mounted on said shaft, said cam plate having at least one non-circular surface on a periphery thereof;
   a pawl pivotally mounted on said cam plate for movement between an inoperative position spaced from said recess and an operative position engaged in said recess;
   at least one controlled abutment movable from a first position in the orbit of said pawl to restrain said pawl from said recess and to a second position spaced from said orbit;
   input means for movement into engagement with said non-circular surface of said cam plate to effect rotation of said cam plate independently of said shaft;
   a spring biasing said input means into engagement with said cam plate; and
   a limit stop on said cam plate for limiting movement of said pawl into said inoperative position, said stop being positioned to limit movement of said input means relative to said non-circular surface.

2. A clutch as set forth in claim 1 wherein said input means includes a pivotally mounted lever having a cam follower thereon, said cam follower being biased into engagement with said non-circular surface.

3. A clutch as set forth in claim 1 wherein said abutment is a pivotally mounted lever and which further comprises a programmer for selectively moving said lever between said first and second positions.

4. A clutch as set forth in claim 1 wherein said shaft is rotatable through a plurality of rest positions and which further comprises a plurality of said abutments, each said abutment being disposed in a respective rest position of said shaft.

5. A clutch as set forth in claim 1 which further comprises means for restoring said abutment to said first position after engagement of said pawl in said recess.

6. A clutch as set forth in claim 5 wherein said restoring means includes at least one cam surface on said cam plate, a pivotally mounted lever connected to said abutment, and a cam follower mounted on said lever for movement on said cam surface wherein said cam surface causes said lever to pivot said abutment to said first position.

7. A clutch as set forth in claim 1 which further comprises an eccentric rotatably mounted on said shaft and secured to said cam plate for rotation therewith to drive the mechanical element.

8. A clutch for moving a mechanical element of a textile machine, said clutch comprising
   an intermittently rotatable input shaft having at least one recess therein;
   a cam plate rotatably mounted on said shaft, said cam plate having at least one non-circular surface on a periphery thereof;
   a pawl pivotally mounted on said cam plate for movement between an inoperative position spaced from said recess and an operative position engaged in said recess;
   at least one controlled abutment movable from a first position in the orbit of said pawl to retract said pawl from said recess and to a second position spaced from said orbit;
   spring biased input means biased into engagement with said non-circular surface of said cam plate to effect rotation of said cam plate and withdrawal of said pawl from said recess;
   means for restoring said abutment to said first position after engagement of said pawl in said recess; and
   a limit stop on said cam plate for limiting movement of said pawl into said inoperative position, said stop being positioned to limit movement of said input means relative to said non-circular surface.

9. A clutch as set forth in claim 8 wherein said input means includes a spring biased piston having a roller mounted at one end thereof, said roller being biased into engagement with said non-circular surface.

10. A clutch as set forth in claim 8 wherein said abutment is a pivotally mounted lever and which further comprises a programmer for selectively moving said lever between said first and second positions.

11. A clutch as set forth in claim 8 which further comprises an eccentric rotatably mounted on said shaft and secured to said cam plate for rotation therewith to drive the mechanical element.

12. A clutch for moving a mechanical element of a textile machine, said clutch comprising an intermittently rotatable input shaft having at least one recess therein;

a first cam plate rotatably mounted on said shaft, said plate having at least one non-circular surface on a periphery thereof, and at least one cam surface on said periphery;

a pawl pivotally mounted on said cam plate for movement between an inoperative position spaced from said recess and an operative position engaged in said recess;

spring means mounted on said cam plate for biasing said pawl towards said shaft and said operative position;

a stop on said cam plate for limiting movement of said pawl into said inoperative position;

at least one controlled abutment movable from a first position in the orbit of said pawl to a second position spaced from said orbit, said abutment being disposed in said first position to initiate retraction of said pawl from said recess;

input means for movement into engagement with said non-circular surface of said cam plate to effect rotation of said cam plate and complete withdrawal of said pawl from said recess;

a spring biasing said input means into engagement with said cam plate; and means for restoring said abutment to said first position after engagement of said pawl in said recess, said means including a pivotally mounted lever connected to said abutment, and a cam follower mounted on said lever for movement on said cam surface wherein said cam surface causes said lever to pivot said abutment to said first position.

13. A clutch as set forth in claim 12 which further comprises an eccentric rotatably mounted on said shaft and secured to said cam plate for rotation therewith.

14. A clutch for moving a mechanical element of a textile machine, said clutch comprising an intermittently rotatable input shaft having at least one recess therein;

a cam plate rotatably mounted on said shaft, said cam plate having at least one non-circular surface on a periphery thereof;

a pawl pivotally mounted on said cam plate for movement between an inoperative position spaced from said recess and an operative position engaged in said recess;

at least one controlled abutment movable from a first position in the orbit of said pawl to restrain said pawl from said recess and to a second position spaced from said orbit;

input means for movement into engagement with said non-circular surface of said cam plate to effect rotation of said cam plate;

a spring biasing said input means into engagement with said cam plate; and means for restoring said abutment to said first position after engagement of said pawl in said recess, said restoring means including at least one cam surface on said cam plate, a pivotally mounted lever connected to said abutment, and a cam follower mounted on said lever for movement on said cam surface wherein said cam surface causes said lever to pivot said abutment to said first position.

* * * * *